(12) United States Patent
Xiu et al.

(10) Patent No.: US 11,580,179 B2
(45) Date of Patent: Feb. 14, 2023

(54) METHOD AND SYSTEM FOR SERVICE AGENT ASSISTANCE OF ARTICLE RECOMMENDATIONS TO A CUSTOMER IN AN APP SESSION

(71) Applicant: salesforce.com, inc., San Francisco, CA (US)

(72) Inventors: Pingping Xiu, Santa Clara, CA (US); Sitaram Asur, Santa Clara, CA (US); Anjan Goswami, Dublin, CA (US); Ziwei Chen, Stockholm (SE); Na Cheng, Dublin, CA (US); Suhas Satish, Fremont, CA (US); Jacob Nathaniel Huffman, Oakland, CA (US); Peter Francis White, San Francisco, CA (US); WeiPing Peng, San Francisco, CA (US); Aditya Sakhuja, Belmont, CA (US); Jayesh Govindarajan, Palo Alto, CA (US); Edgar Gerardo Velasco, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 1058 days.

(21) Appl. No.: 16/139,386

(22) Filed: Sep. 24, 2018

(65) Prior Publication Data

US 2020/0097608 A1 Mar. 26, 2020

(51) Int. Cl.
*G06N 5/00* (2006.01)
*G06F 16/9535* (2019.01)
(Continued)

(52) U.S. Cl.
CPC ........ *G06F 16/9535* (2019.01); *G06F 16/338* (2019.01); *G06F 16/35* (2019.01);
(Continued)

(58) Field of Classification Search
CPC .... G06F 16/9535; G06F 16/35; G06F 16/338; G06N 5/00; G06N 5/003; H04L 67/327
See application file for complete search history.

(56) References Cited

U.S. PATENT DOCUMENTS 5,577,188 A 11/1996 Zhu
5,608,872 A 3/1997 Schwartz et al.
(Continued)

*Primary Examiner* — Michael J Huntley
*Assistant Examiner* — Sehwan Kim
(74) *Attorney, Agent, or Firm* — LKGlobal | Lorenz & Kopf, LLP

(57) ABSTRACT

A method and system for recommending articles including: receiving a customer request from the customer during the session; generating case data for a case, by an article recommender app; configuring a training set based on the subject and description data of the customer request; identifying, by an artificial intelligence (AI) app, a first pool of articles from a knowledge database; identifying by at least one query, a second pool of articles from a case article database to into a merged pool of articles; assigning, by the AI app, an implicit label to one of the first pool and the second pool of the articles; applying a model derived by the AI app based on customer behavior and a set of features related to the case to classify each article of the merged pool of articles based at least in part on the predicted relevance of the article.

14 Claims, 9 Drawing Sheets

(51) Int. Cl.
*G06F 16/35* (2019.01)
*G06F 16/338* (2019.01)
*H04L 67/63* (2022.01)

(52) U.S. Cl.
CPC .............. *G06N 5/00* (2013.01); *G06N 5/003* (2013.01); *H04L 67/63* (2022.05)

(56) References Cited

U.S. PATENT DOCUMENTS

| | | | |
|---|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,406,467 B1 * | 7/2008 | White ................ G06Q 30/0204 |
| | | 715/962 |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,527,814 B1 * | 9/2013 | Elwell ................ G06F 11/0793 |
| | | 717/124 |
| 8,566,301 B2 | 10/2013 | Rueben et al. |
| 8,646,103 B2 | 2/2014 | Jakobson et al. |
| 10,325,285 B1 * | 6/2019 | Wai ................ G06Q 30/0255 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |

(56) References Cited

U.S. PATENT DOCUMENTS

| | | | |
|---|---|---|---|
| 2012/0042218 A1 | 2/2012 | Cinarkaya et al. | |
| 2012/0130910 A1* | 5/2012 | Al-Alami | G06Q 30/016 |
| | | | 705/304 |
| 2012/0143911 A1* | 6/2012 | Liebald | G06F 16/337 |
| | | | 707/771 |
| 2012/0218958 A1 | 8/2012 | Rangaiah | |
| 2012/0233137 A1 | 9/2012 | Jakobson et al. | |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya et al. | |
| 2015/0302470 A1* | 10/2015 | Dru | G06Q 30/0277 |
| | | | 705/14.51 |
| 2016/0042275 A1* | 2/2016 | Dettman | G06N 5/003 |
| | | | 706/46 |
| 2016/0104067 A1* | 4/2016 | Xu | G06F 16/951 |
| | | | 706/46 |
| 2016/0111013 A1* | 4/2016 | Labutov | G09B 7/06 |
| | | | 434/353 |
| 2018/0144268 A1* | 5/2018 | Wilson | G06N 5/022 |
| 2018/0189292 A1* | 7/2018 | Grace, Jr. | G06F 16/24578 |
| 2018/0373840 A1* | 12/2018 | Foti, Jr. | G16H 20/70 |
| 2019/0361977 A1* | 11/2019 | Crudele | G06K 9/6256 |

\* cited by examiner

METHOD AND SYSTEM FOR SERVICE AGENT ASSISTANCE OF ARTICLE RECOMMENDATIONS TO A CUSTOMER IN AN APP SESSION

TECHNICAL FIELD

Embodiments of the subject matter described herein relate generally to on-demand real-time information selection and communications over peer-to-peer connections. More particularly, embodiments of the subject matter relate to a method and system to identify and select preferred articles in in-app sessions between clients and service agents.

BACKGROUND

Currently, on-demand apps are used to integrate live service agent support directly in apps and webpages. These on demand apps enable customers to facilitate fast engagements by providing a convenient means of requesting from mobile devices in which the customer client is operating on-demand services by merely actuating the on-demand app button on the customer client. A request is executed in an instant to initiate an on-demand session with a service agent remotely located. Hence, upon actuating the app, a session is initiated between the customer client and service agent, and a one-to-one seamless communication connection is created in one step. The customer can receive immediate real-time customer support in the session from the service agent.

Having such on-demand instantaneous communication creates a time of the essence environment for providing relevant information by the service agent to the customer. For example, there is a need to provide articles and other media of relevance by the service agent to the particular topics, requests, or other subjects of discussion at the moment or in the near future to customer to enhance the customer session experience. Hence, the service agent must be able to retrieve relevant information to a customer request without having to spend time filtering the information by reviewing articles that are only of remote interest and not directly pertinent to the present immediate discussion. This is, the user experience is degraded by latency time spent by the service agent to: review irrelevant or remotely relevant material, spend time to formulate a response to the customer, and not have insight into similar kinds of requests and answers provided in the past to the issues raised by other customers. In the app session, time is of the essence in providing meaningful responses to customers and the service agent not only has to retrieve relevant information but may also has to educate his or her self about the issue during the session and in parallel continue a dialog with the customer. This is particularly taxing when the service agent is confronting customer requests where the service agent lacks a familiarity with a particular service or product or one that entails a steeping learning curve for a more complete understanding especially when nuanced requests and questions are asked by customers requiring in-depth know how and product/service experience.

Accordingly, it is desirable to capitalize on past collaborative shared experiences of service agents when responding to customer issues, requests, and questions, to provide content and articles shared of similar if not the same types of issues, requests, questions, fixes etc. in the on-demand app session between the service agent and customer.

It is desirable to provide a mechanism to aid the service agent in responding to the customer; to aid the service agent in nuance and intuitive understandings of a service or product; and to aid the service agent in a roadmap to find fixes to the customer issues and requests without having to do copious independent research by his or her self without adequate training or insight of how other service agents have confronted or solved similar problems.

It is desirable to exchange information using a multi-tenant platform for sharing database information during the customer agent session. In an exemplary example, it is desired to configure the an on-demand app to enable the service agent to access information from a database associated with the multi-tenant platform relating to articles and objects past identified as relevant or by other attributes.

It is desirable in the on demand app session to allow for more types of interaction than simply the customary voice and text messaging when communicating on-demand. Such additional information exchanges are directed to articles which can be generated by using artificial intelligence apps to enable the service agent to immediately identify viewed articles of interest during the session for further review, sharing, and information collection.

It is desirable to use a multi-tenant cloud-based architectures to improve collaboration, integration, and community-based cooperation between service agents within tenant organizations without sacrificing data security.

Furthermore, other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
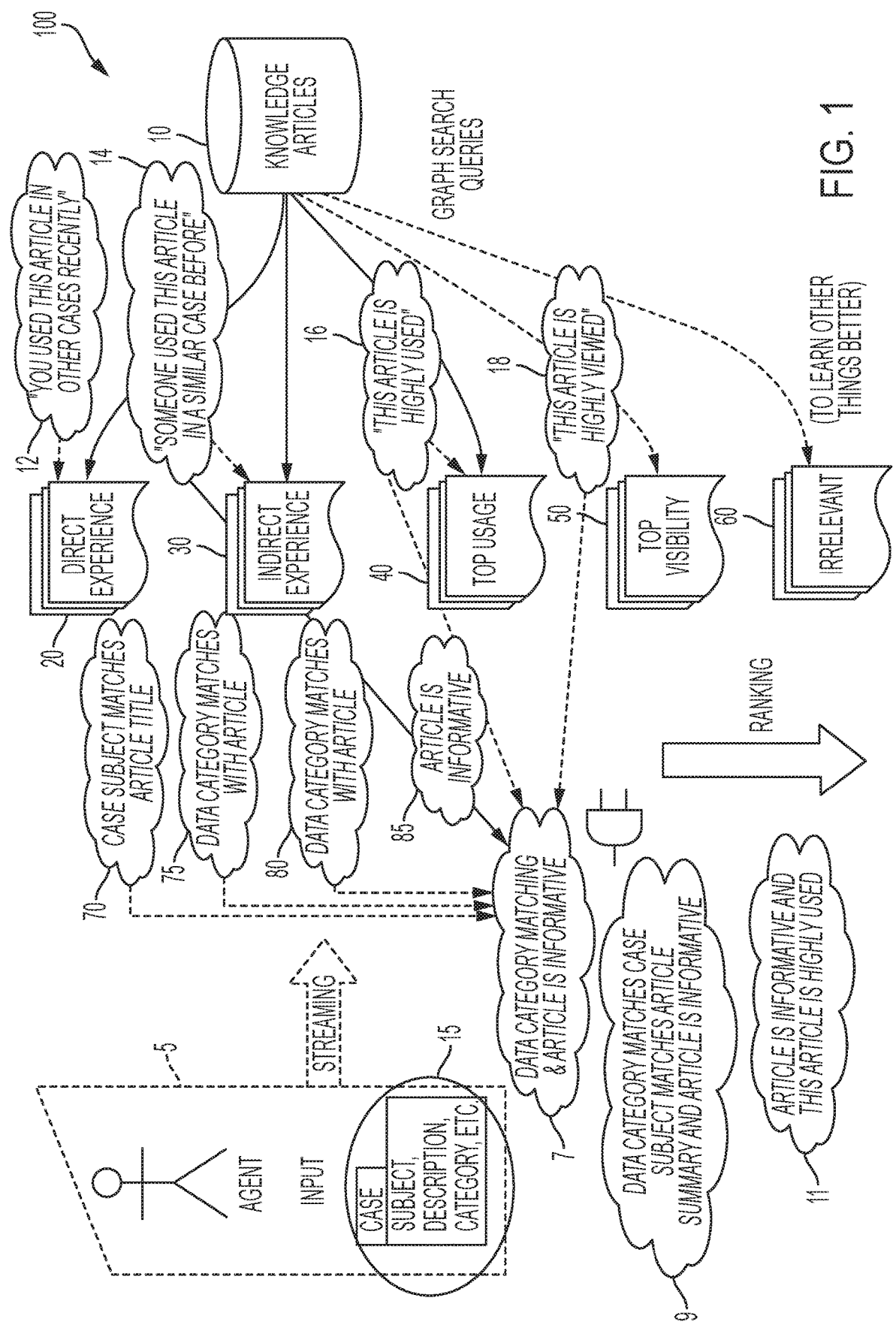
FIG. 1 is an exemplary functional diagram illustrating the communication process between the customer and service agent of the article recommender system in accordance with an embodiment.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to systems and methods for recommending articles to customers by service agents in response to events associated with service request or support of enterprise applications. More specifically, the subject matter relates to the execution of action items corresponding to a service request placed by the customer based on a service agreement by a vendor for support of an enterprise application. For example, a customer in the course of use of an enterprise application will have issues and subsequent requests to service agent to resolve such issues. There may be a number of service agents tasked with assisting customers with such requests and the particular service agent responding to the customer request may not have the required knowledge or information to answer the questions raised. Hence, it would be beneficial if the particular service agent had access to the knowledge of the other service agent that could respond. By using the tools of the article recommender system, the particular service agent would be directed by the system which is based on collaborative knowledge of all the service agents created and organized by each agent responses with selected articles to enable the particular service agent to learn of such responses and follow similar courses of action when deemed the best solution by identifying preferred articles with information to use in the response to the customer.

In various embodiments, article recommender systems and methods are described by the present disclosure which include a analytic framework that pulls historical customer questions or cases and the associated articles from multiple heterogeneous sources. The example sources can be a database table where there is stored case and article associations or a conversation chain in a community where individuals sometimes post articles in response to questions. An example of such a community is the SALESFORCE® community of an enterprise SALESFORCE® platform of networked customer and service agents.

In various exemplary embodiments, article recommender systems and methods use various available natural language processing (NLP) and information retrieval (IR) based features from all the textual data to capture the semantic structure of the articles further configured on the network enterprise platform integrated with on-demand video/voice, instant messenger, email communication apps or in-apps between customers and service agent. As an example, the SALESFORCE® Platform can be configured with SALESFORCE® EINSTEIN™ application which is a layer of artificial intelligence that delivers predictions and recommendations based on customer enterprise processes and customer data.

The article recommender system computes similar features from the structured case data where a case may have a title, description, and several other fields. This enables the system to construct feature spaces in each case and the pools of articles. The article recommender system then computes a scaler product for each NLP and IR based feature space between the cases and the articles to determine a set of feature vectors. The system then can associate positive and negative labels for the feature vectors based on some heuristics (ex. implicit labeling heuristics). The positive labels are derived from the case and article vector associations and the negative labels are derived by arbitrarily assigning random or selectively chosen, or likely irrelevant articles to the cases.

Once a feature matrix with the positive and negative labels is constructed, various learning algorithms can be implemented by the article recommender system to generate one or more ranking models for the case and pools of articles. The models can be used to generate top k ranked articles for aiding service agents with dialogs responsive to requests related to the case of a customer. The service agents can vote or an automated determination can be executed to determine attributes associated with an article such as whether the article sent is deemed to be a "positive" or a "negative" choice in process by the agent of a responsive action to the case or the customer request. For example, in instances, when a selected document is used to resolve a customer case, the article is deemed "positive" and the service agent can automatically retain the article as an attached article to the case in various database tables of pooled articles.

Further, it is contemplated in the present disclosure of discovery techniques using artificial intelligence (AI) models for automatically recommending or suggesting articles from knowledge data bases based on pooling, classifying, ranking, viewing and random sampling as well as historical data of recommended "positive" articles by heuristics of applications of the article recommender system to aid or ease the service agent in finding or discovering relevant articles and for capitalizing on pertinent prior suggested article know-how by other service agents using the enterprise platform for similar types of customer requests. The resultant action is a case enabling with an expedite response action without requiring significant time consuming in-depth research by the service agent.

Certain terminologies are used with regard to the various embodiments of the present disclosure. Multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users.

The described subject matter can be implemented in the context of any computer-implemented system, such as a software-based system, a database system, a multi-tenant environment, or the like. Moreover, the described subject matter can be implemented in connection with two or more separate and distinct computer-implemented systems that cooperate and communicate with one another. The subject matter may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

FIG. 1 is an exemplary functional diagram illustrating the communication process between the customer and service agent of the article recommender system in accordance with an embodiment. As described, with reference to FIG. 1, FIG. 1 is an exemplary functional diagram illustrating the communication of the service agent and customer in accordance with an embodiment. A service agent recommender system 100 includes inputs from a service agent 5 during a session with a customer to a knowledge article database 10. The inputs 15 may consist of data of the case, subject matter, description, category etc. The inputs 15 may be constantly augmented and refined during the session with the customer and streamed to the knowledge article database 10 for analysis by an artificial intelligent application or a machine learning application connected to or part of the knowledge article system. This recursive process of constant input and output by the knowledge article system allows for narrowing and exacting of the articles presented in a set of on the fly labeling or classifications in pools of articles defined by direct experience 20, indirect experience 30, top usage 40, top visibility 50 and irrelevancy 60 groupings. A knowledge analysis is performed by an artificial intelligence (AI) app based on a series of tests or Tasks. In an exemplary example, the AI app in order to determine a pool of articles meets conditions of relevancy, usage, top viewing etc. a list of semantic tests are applied. For example, a test is applied because of direct experience 20. Additionally, other set of rules would be applied as follows: the article was used in other cases recently? 12; for indirect experience, another service agent used the article for a similar case?; for top usage, this article is highly used?; for top visibility, this article is highly viewed?; for irrelevancy, this article was used for other thing?. Next, more sets of rules can be applied, as follows: the case subject matches article title? 70; the case subject matches article summary? 75 data category matches with article? 80; the article is informative? 85. Additionally, questions can be applied such as: is the data category matching informative 7, does the category match, does the case subject match the articles summary and is the article informative 9; is the article informative and is the article highly used? 11. Also, the results from these questions may be used to determine a ranking of the articles.

Figure 2:
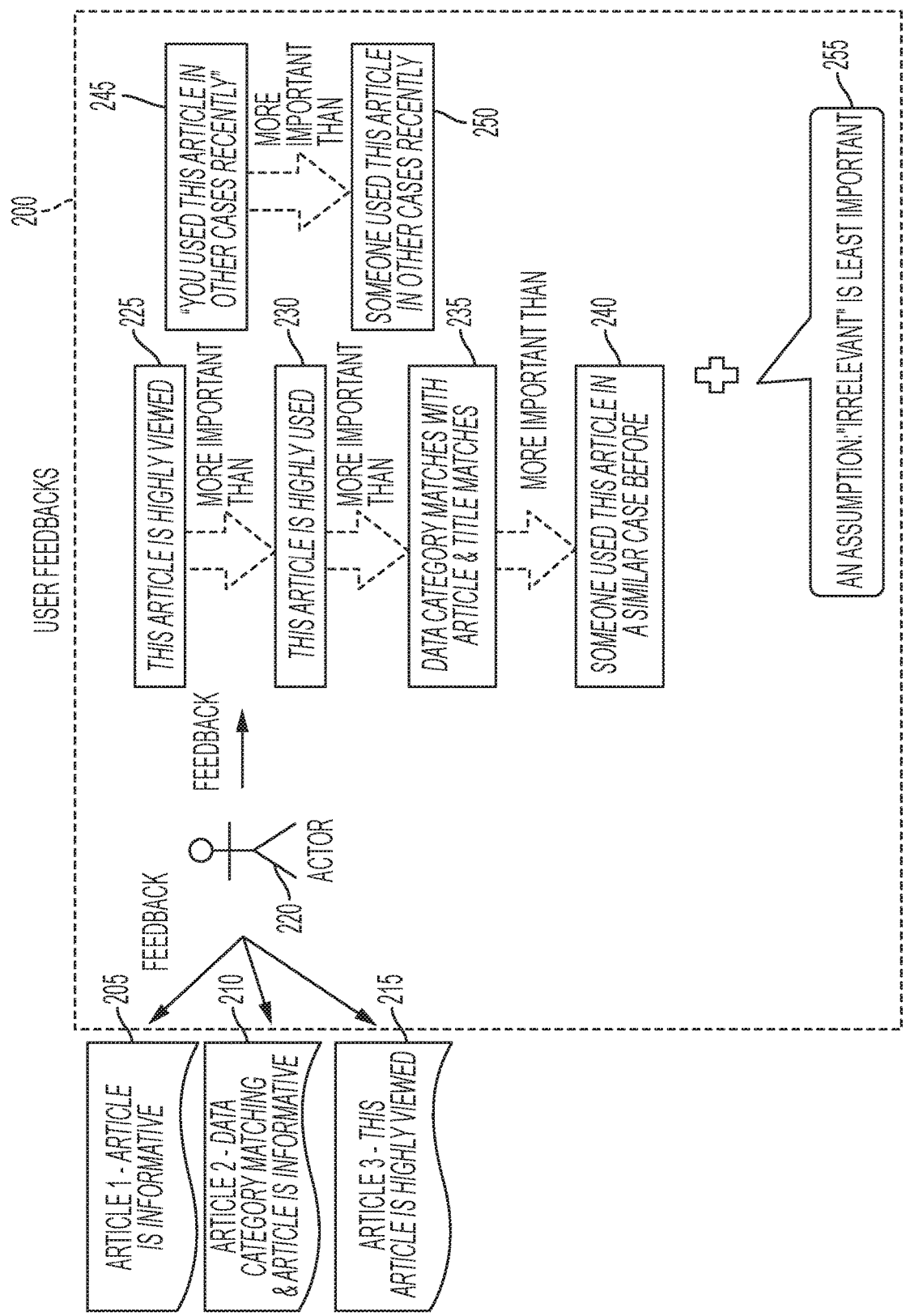
FIG. 2 is an exemplary diagram that illustrates a ranking and user feedback of articles in the article recommendation system in accordance with an embodiment.

FIG. 2 is a diagram that illustrates a ranking and user feedback of articles in the article recommendation system in accordance with an embodiment. In various exemplary embodiments, the article ranking is illustrated with a first article "article 1" which is deemed informative; a second article "article 2" which is deemed "data category matching and article is informative"; and a third article "article 3" which is deemed highly informative. The service agent generates feedback about each article of the exemplary set of "article 1"; "article 2" and "article 3"; and an article recommender analysis app/engine categorizes the feedback into pools (i.e. clusters or groupings) of "article is highly informative" 225, the article is highly used" 230, the data category matches with article and title matches" 235, the "someone used this article in a similar case before" 240, the service agent used the article 250 in a similar case before, or the article is irrelevant 255. The feedback pooling can be determined by natural language processing (NPL) of session data communications with the service agent and the customer by identifying key words and phrases and deductive applications to categorized the articles based on the NPL processing of the session data communications. Alternately, meta-data associated with the article; For example, meta-data of the requests for the article, views of the article and similarity of the article can be used to rank and pool the article in the categories identified, with the particular enterprise customer requests and with other undefined commonalities such as usage and content of the article.

Figure 3:
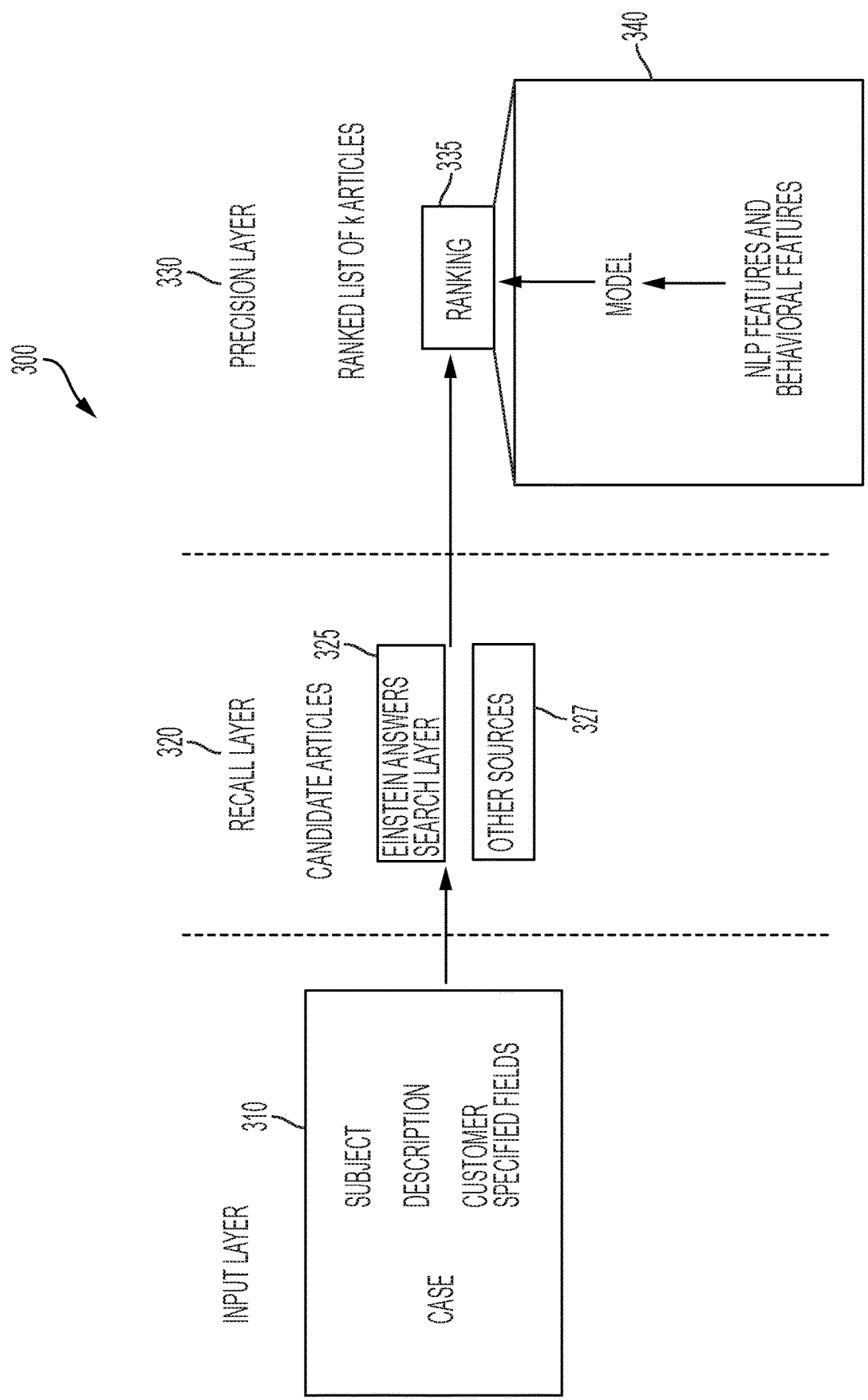
FIG. 3 is an exemplary diagram of the architecture of an input layer, a recall layer and a precision layer of the article recommender system in accordance with an embodiment.

FIG. 3 is a diagram of the architecture of an input layer, a recall layer and a precision layer of the article recommender system in accordance with an embodiment. In the exemplary embodiment of the architecture diagram 300 of the article recommender system, there is illustrated a multilayer configuration composed of a first, second and third layer. The first layer is the input layer 310 and configures the data of a case or request from a customer to a service agent. When the case is received by the service agent, the input layer 310 configures the case with as a record.

In various embodiments, the record could be a request or investigation responsive to a customer request currently being performed at the present time in accordance with a service agreement by the vendor to the customer. In some instances, in a particular embodiment, a request of the input layer 310 can be placed on a distributed ledger of a blockchain by an entity (e.g., person, organization, business) associated with an blockchain node. The blockchain node may be an "assertor" blockchain node capable given privileges to place the record on the distributed ledger of the blockchain. For the record there would also be a consensus process defined by the service agreement to validate the record.

Next at the recall layer 320, various candidate articles would be received by the input layer 310 for input into an AI analysis app (ex. EINSTEN™ SALESFORCE® artificial intelligence app) as well as other sources 327 capable of classifying, learning, pooling, machine learning for discovery of direct and indirect recommended articles to the service agent. Next at precision layer 330, the articles identified by the recall layer 320 would be received and accorded a ranking 335 afforded by a number of attributes associated with article such as number of time referred too, number of times viewed, number of times determined directly relevant, number of times determined indirectly relevant etc. The ranking would also be based on historical liking and profile data related to the particular service agent may be used to further identify a ranking and best fit priority scheme for the sending the articles to agent. In addition, a model 340 is derived by an analysis by the article recommender system from empirical and application solutions creating a framework to model NLP features and behavior features in the model providing control input to a scheduler type application ranking the articles.

Figure 4:
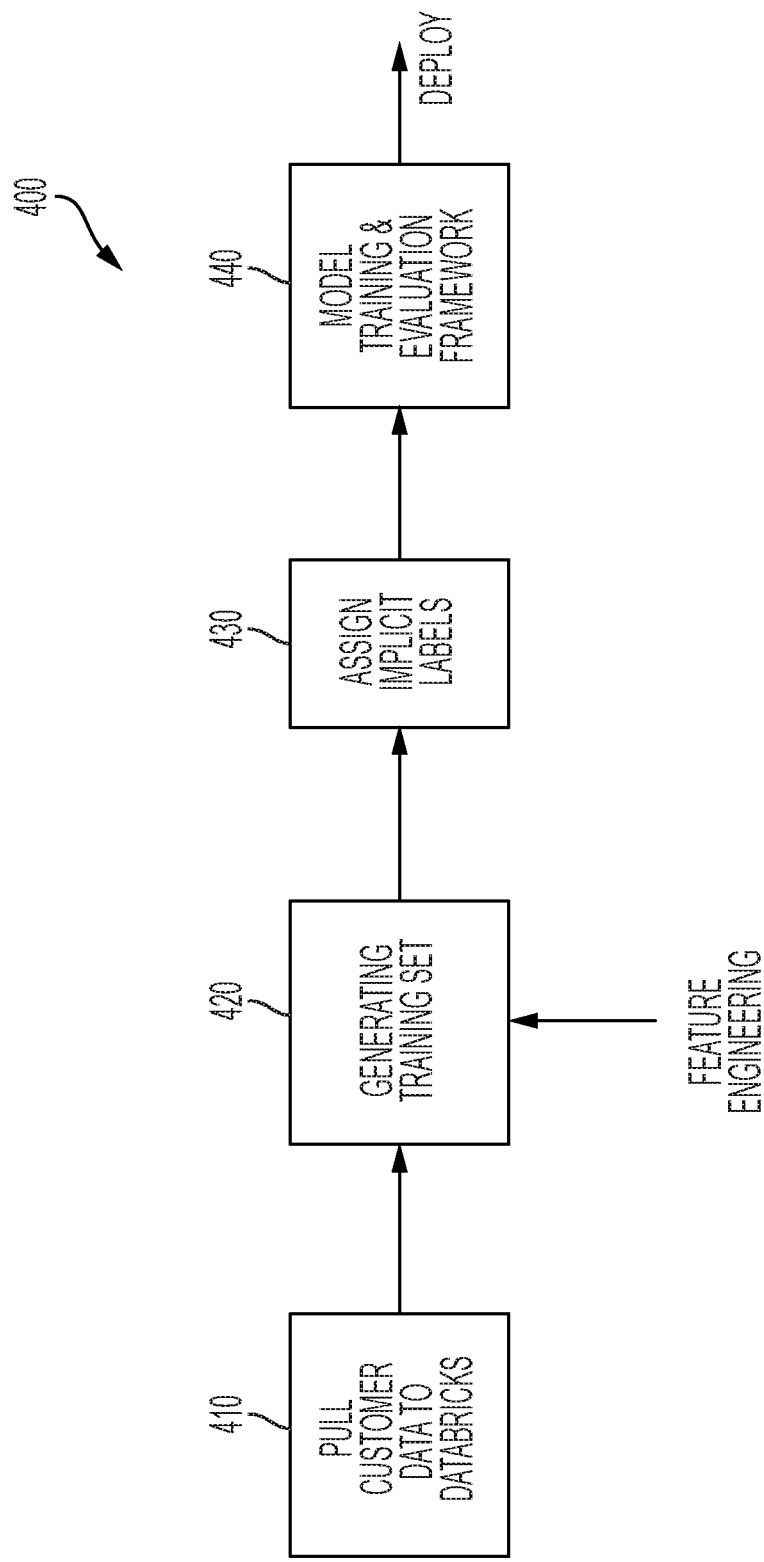
FIG. 4 is an exemplary pipeline diagram of a framework for the AI app for receiving and analysis of the customer data by training, labeling and modeling of the article recommender system in accordance with an embodiment.

FIG. 4 is pipeline diagram of a framework for the AI app for receiving and analysis of the customer data by training, labeling and modeling of the article recommender system in accordance with an embodiment. The AI platform framework 400 include initially pulling customer data for formatting in data bricks at 410. Then, at 420 generating a training set with feature inputs for assigning each training set with implicit labels at 430. Once the implicit labeling is assigned, then at 440, the article recommender system can model training and create an evaluation framework at 450 for deployment on the platform.

Figure 5:
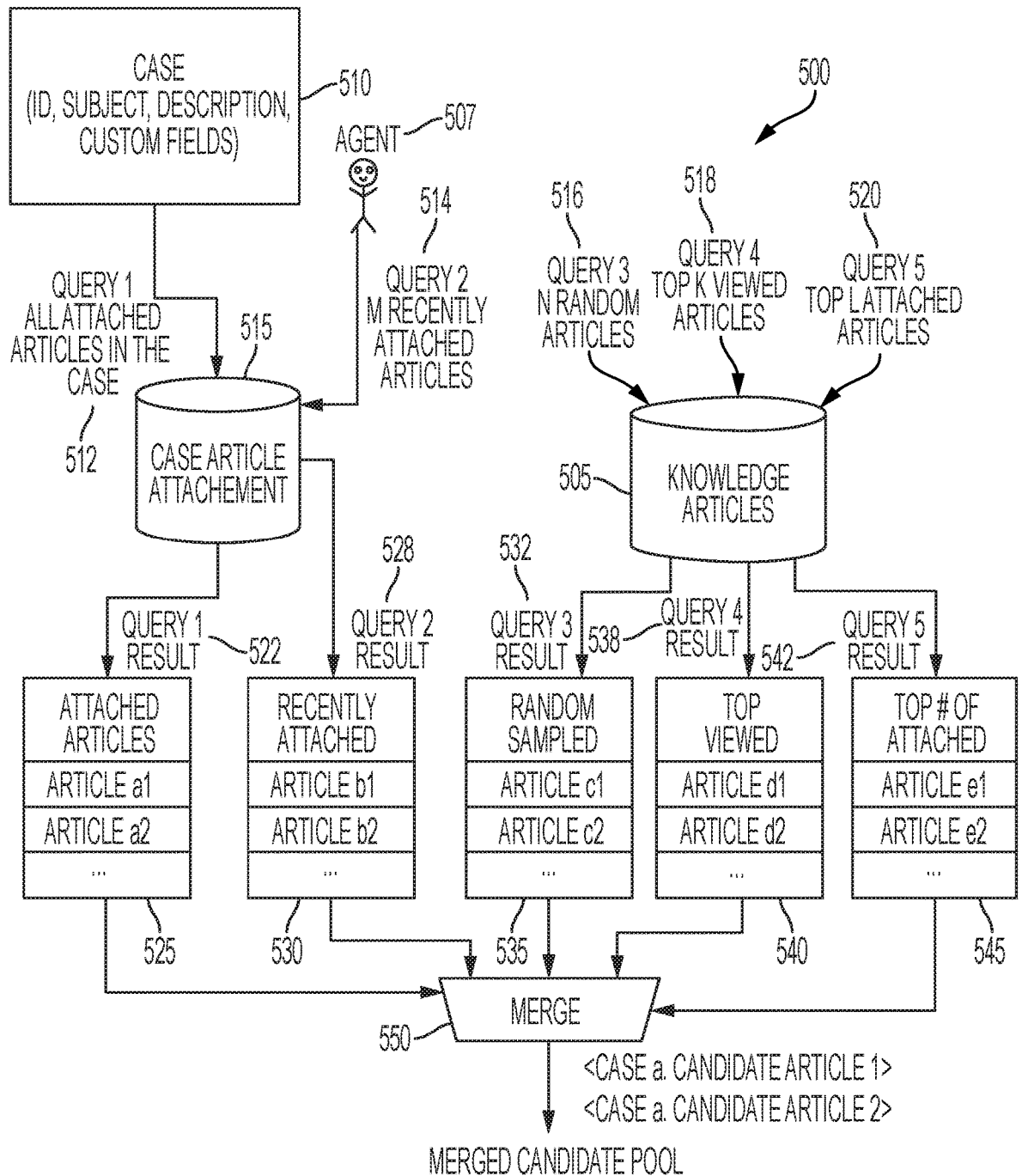
FIG. 5 is an exemplary functional diagram of aggregating or pooling together various candidate groups or pools in response to various queries for the article recommender system in accordance with an embodiment.

FIG. 5 is functional diagram of aggregating or pooling together various candidate groups or pools in response to various queries for the article recommender system in accordance with an embodiment. In FIG. 5, there is shown a candidate pooling diagram 500 to generate a merged candidate pool to (1) reflect online candidate pools, (2) simulate potential online candidates, and (3) comprehend user behavior to essentially increase or augment a limited candidate pool of data of the enterprise article recommender platform to enable more accurate pooling of recommended articles to the various queries. At block 510, a case record with an identification label, subject, description as well as various other custom fields is received. Next, a set of queries can be generated from the article recommender system, the service agent 507 by manual input, and by AI applications of the AI analysis app associated with knowledge article database 505. As illustrated in FIG. 5, the following various queries are created of: a first query 512 of "query 1" of all attached articles to the case; a second query 514 of "query 2" of "M" recently attached articles to the case; a third query 516 of "query 3" of "N" random articles; a fourth query 518 of "query 4" of top "K" viewed articles; and a fifth query 520 of "query 5" of top "L" attached articles.

The first query and the second query are sent to the case article attachment database 515 for updating the case article attachment database 515 with additional attached articles. However, the knowledge article database 505 is updated with none of the "all" or "M" recently attached articles but with the articles pooled from the third and fourth queries and attached articles of the fifth queries which include the random articles, and the top "k" viewed articles of "query 3" and "query 4", and the top "L" attached articles of "query 5". An output from the case article attachment database 575 includes a first and a second resultant query. The first resultant query of "query 1 result" 522 is sent attachment article pool 525 of attached articles, and the second resultant query of "query 2 result" 528 is sent recent attachment article pool 530 of recently attached articles. The output from the knowledge article database 505 includes a third, a fourth, and a fifth resultant query. The third resultant query of "query 3 result" 532 is sent to random sampled article pool 535 of random articles; the fourth resultant query of "query 4 result" 538 is sent to top viewed article pool 540 of top viewed articles; and the fifth resultant query of "query 5" 542 is sent to top number "#" of attached article pool 545 of a top number of attached articles. The output from each of the pools, that is the articles from each pool of: attachment article pool 525, recent attachment article pool 530, random sampled article pool 535, top viewed article pool 540, and top number "#" of attached article pool 545 are each merged to together by a merging configured functional processor block 550 using various application solutions of the article recommender system to create a merged candidate pool (ex. a list of cases with corresponding articles in accordance with a particular listing or priority scheme).

Figure 6:
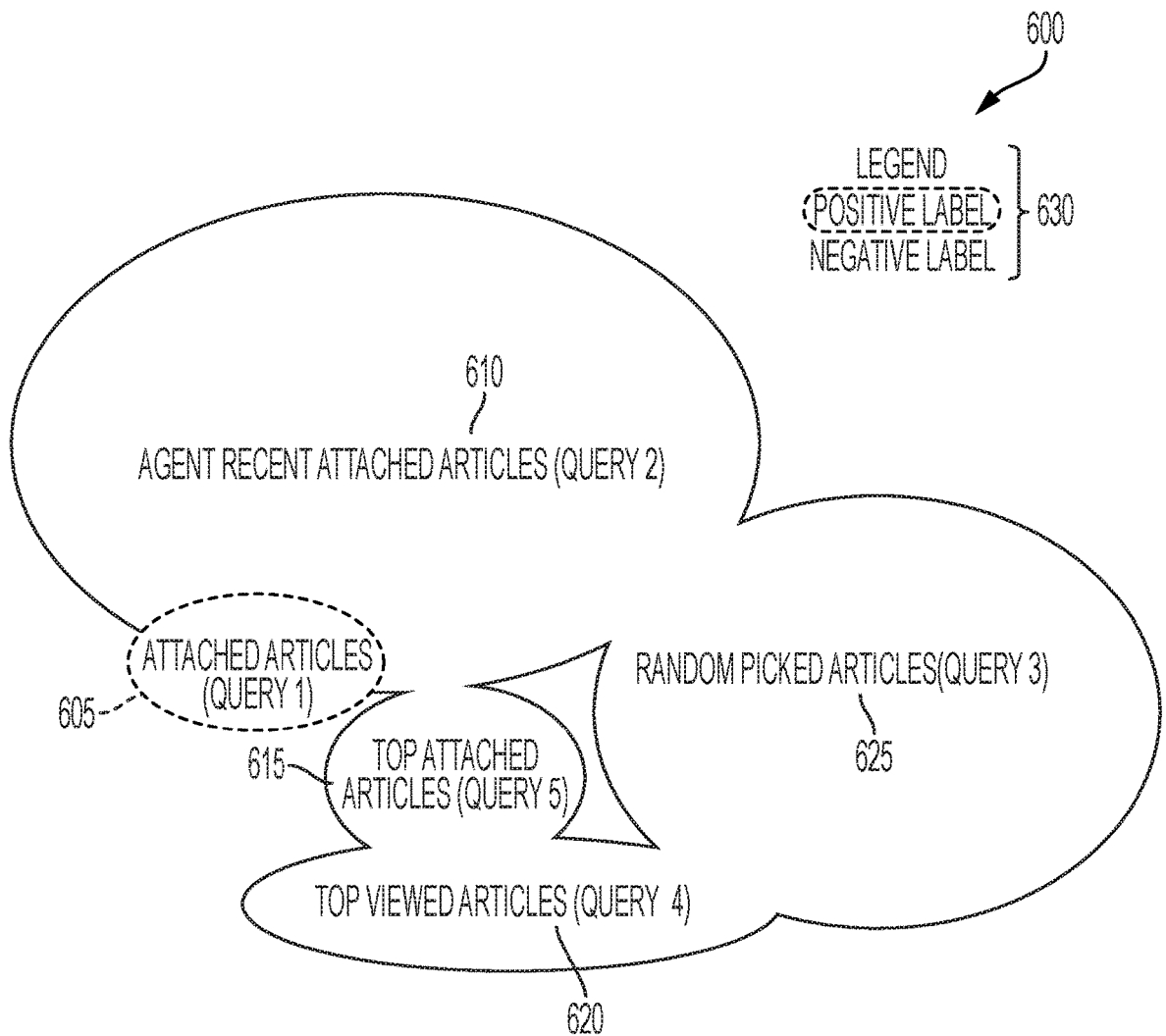
FIG. 6 is an exemplary function diagram of the assigning of the implicit labeling to each candidate pool of the article recommender system in accordance with an embodiment.

FIG. 6 is a function diagram of the assigning of the implicit labeling to each candidate pool of the article recommender system in accordance with an embodiment. In FIG. 6, there is shown a legend 630 of implicit labeling of "positive" or "negative" labels to articles by the article recommender system. The function diagram 600 illustrates pools of articles as configured and described in FIG. 5 as follows: a first article query "query 1" 605 which is a subset of a pool of recently attached articles and top attached articles of a service agent and is a pool of attached articles; a second query 610 of "query 2" of a service agent pool of recent attached articles; a third query 625 "query 3" of a pool of random picked articles; a fourth query 620 "query 4" of a pool of top viewed articles; and a fifth query 615 "query 5" of top attached articles. The random pick articles of the third query 625 and the top viewed articles of the fourth query 620 are shown as not overlapping on any region of the attached articles. Only the attached articles of the pool of the first query 605 are deemed by the heuristic or logic to have "positive" implicit labels while the other pools of the second, third, fourth and fifth queries are deemed to have "negative" implicit labels.

In an exemplary embodiment, the current logic or heuristic for assigning positive and negative labelling to a validated candidate pool is as follows: a current logic For a <case, article> pair in the merged candidate pool: If the article is attached to this case then Assign Positive Label; If the article is from Agent Recent Attached Articles BUT not attached to this case, then Assign Negative Label; If the article is from Random Picked Articles BUT not attached to this case then Assign Negative Label; If the article is from Top Viewed Articles BUT not attached to this case then Assign Negative Label; If the article is from Top Attached Articles BUT not attached to this case then Assign Negative Label.

Figure 7:
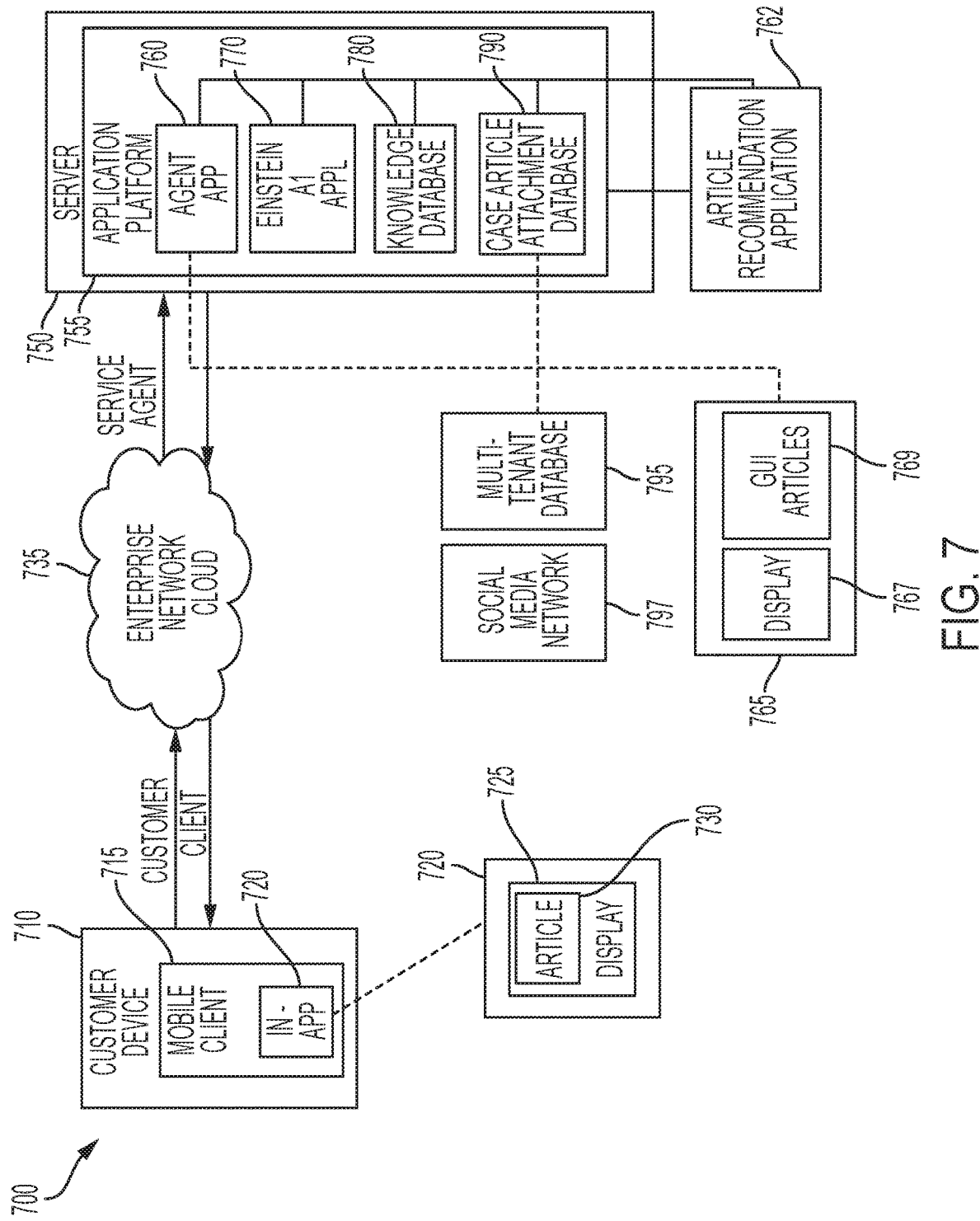
FIG. 7 is an exemplary network configuration diagram of the customer app in communication via an enterprise network cloud to the customer agent app for sharing articles of the article recommender system in accordance with an embodiment.

FIG. 7 is a network configuration of the customer app in communication via an enterprise network cloud to the customer agent app for sharing articles of the article recommender system in accordance with an embodiment. The cloud based network system 700 includes the components of a customer device 710 (ex. mobile device) for communicating via an enterprise network cloud 735 to a server 750 for supporting an article recommender system app which operates on-demand with communicating via the enterprise network cloud 735 to the customer device 710 and the hosted service agent app 760 which includes an article recommender app 762 by the server 750. The enterprise network cloud 735 can include interconnected networks including both wired and wireless networks for enabling communications of the customer device 710 via a customer client 715 to the service agent app 760. For example, wireless networks may use a cellular-based communication infrastructure that includes cellular protocols such as code division multiple access "CDMA", time division multiple access "TDMA", global system for mobile communication "GSM", general packet radio service "GPRS", wide band code division multiple access "WCDMA" and similar others. Additionally, wired networks include communication channels such as the IEEE 802.11 standard better known as "Wi-Fi", the IEEE 802.16 standard better known as "WiMAX", and the IEEE 802.15.1 better known as "Bluetooth". The enterprise network cloud 735 allows access to communication protocols and application programming interfaces that enable real-time communication over peer-to-peer connections.

As an example, this may include protocols from open source software packages for service agent apps such as a real-time video-chat and/or messenger app to communicate over an enterprise network cloud 735 as described here. The web real-time Communication "WebRTC", which is an open source software package for real-time voice, instant messenger and video on the web, can depending on the version be integrated in the Chrome, IOS, Explorer, Safari and other browsers for peer-to-peer communications. Additionally, WebRTC can enable in-app video-chat and instant messenger communications through different browsers through a uniform standard set of APIs.

The customer device 710 includes the customer client 715 which use a software development kit "SDK" platform. This SDK platform can provide one step activation of an on-demand services via the in-app application 720 such as shown here of the customer client 715 and an user interface "UI" of the in-app application of the customer display 725 for activating the on-demand service and displaying the sent over articles 730 to the customer by the service agent. The customer device 710 may include any mobile or connected computing device including "wearable mobile devices" having an operating system capable of running mobile apps individually or in conjunction with other mobile or connected devices. Examples of "wearable mobile devices" include Google Glass® and Android® watches. Additionally, connected device may include devices such as vehicles, home appliances, tooth brushes, light sensors, air conditioning systems. Typically, the device will have display capabilities such as a display screens and also may have associated keyboard functionalities or even a touchscreen providing a virtual keyboard and buttons or icons on a display. Many such devices can connect to the internet and interconnect with other devices via Wi-Fi, Bluetooth or other near field communication (NFC) protocols. Also, the use of cameras integrated into the interconnected devices and GPS functions can be enabled.

The customer client 715 may additionally include other in-app applications as well as SDK app platform tools and further can be configurable to enable downloading and updating of SDK app platform tools. In addition, the customer client 715 uses an SDK platform which may be configurable for a multitude of mobile operating systems including Android, Apple iOS, Google Android, Research in Motion's BlackBerry OS, Nokia's Symbian, Hewlett-Packard's webOS (formerly Palm OS) and Microsoft's Windows Phone OS etc. . . . .

The in-app application 720 of the customer client 715 provided on the SDK platform can be found and downloaded by communicating with an on-line application market platform for apps and in-apps which is configured for the identifying, downloading and distribution of apps which are prebuilt. One such example is the SALESFORCE APPEX-CHANGE® which is an online application market platform for apps and in-apps where the downloading, and installing of the pre-built apps and components such as an in-app application 720 for the customer client 715 with the article recommender features can be downloaded.

In addition, these on-line application market platforms include "snap-in" agents for incorporation in the pre-built apps that are made available. The in-app application 35 may be configured as a "snap-in" agent where the snap-in agent is considered by the name to be a complete SDK packages that allows for "easy to drop" enablement in the customer client 715 or in webpages. An example of a "snap-in" agent is the "SALESFORCE® SOS" which is a snap-in agent hosted by the SALESFORCE APPEXHCANGE® and enables an UI to be embedded into the customer client 715. The UI provides an instantaneous connection directly to the service agent and provides on-demand live audio or video support and on-display sharing of recommended articles. In this example, the complete SDK snap-in agent provides the in-app application 720 with one-touch access to a customer support agent, as well as display sharing with the customer in-app application 720. That is, in this instance there is a service agent provided in video-chat communications of the in-app application 720 on the customer device 710. This is provided by the SALESFORCE SERVICECLOUD® that enables service agents to have video-chat face to face sessions with in-app features of the article recommender app for customers using the customer client 715 in real time.

The server 750 acts as a host and includes the service agent app 760 that is configured for access by an enterprise application platform 755. The enterprise application platform 755 can be configured as a platform as a service ("Paas") that provides a host of features to develop, test, deploy, host and maintain-applications in the same integrated development environment of the enterprise application platform. Additionally, the enterprise application platform 755 may be part of a multi-tenant architecture where multiple concurrent users utilize the same development applications installed on the enterprise application platform 755. Also, by utilizing the multi-tenant architecture in conjunction with the enterprise application platform 755 integration with web services and databases via common standards and communication tools can be configured. As an example, SALESFORCE SERVICECLOUD® is an application platform residing on the server 750 that hosts the service agent app 760 and may host all the varying services needed to fulfil the application process including the article recommender app 762, the case article attachment database 790, the knowledge database 780 and the AI app 770 (i.e., SALESFORCE EINSTEIN™ app). In exemplary instances, each of these apps on the SALESFORCE SERVICE-CLOUD® can be connected to a multi-tenant database 795 and/or a social media network 797 for receiving other articles related to the customer request. The service agent app 760 may include a service agent article recommender in-app 765 configured with a service agent display 767 and view of objects 769 configured for the recommended articles. The display can be configured to be a shared display. In an example of the SALESFORCE® SOS™ in-app, a set of functions can control display sharing between the service agent and customer by using an object linked to share the recommended article in the customer display 725 with sharing settings on a manager set by the service agent in the session.

Additionally, the enterprise application platform 755 has access to other databases for information retrieval and include a knowledge database 780 where both service agents and customers alike can search for the answers they need. The knowledge database 780 may be part of the multi-tenant database architecture allowing for communication with service agent app 760 and other mobile clients. The knowledge database 780 may include an article repository configured to the allow the service agent app 760 to browse for information relating to the articles, other than article content and send that information to the customer client 715 (i.e. object images or data). In addition, the enterprise application platform 755 can access a multi-tenant database 795 which is part of the multi-tenant architecture. The multi-tenant database 795 allows for enterprise customer access and the enterprise application platform 755 may be given access to the multi-tenant database dependent upon differing factors such as a session ID associated with the customer session.

In various embodiments, queries received by the service agent app 760 may be performed using a structured query language "SQL" of the knowledge database 780 that may match header information tagged to the packet data of the block to identify related block articles. When performing this search, call procedures that are used in the search algorithm are performed in branches of trees of the knowledge database 780, the call procedures are not randomly performed but follow paths that are enterprise specific to a customer.

In various embodiments, the Natural Language Decathlon (decaNLP) can be used by the AI app 770 to model a Multi-Task Question Answering Network (MQAN) in PyTorch, an open source machine learning library for the Python programming language. The multi-Task question answering network (MQAN) is designed for decaNLP and makes use of a dual co-attention and multi-pointer-generator decoder to multi-Task across all Tasks in decaNLP. Our results demonstrate that training the MQAN jointly on all Tasks with the right anti-curriculum strategy can achieve performance comparable to that of ten separate MQANs, each trained separately. MQAN can prove to be a trained model in the single-Task setting as well, achieving results on the semantic parsing component of decaNLP.

Figure 8:
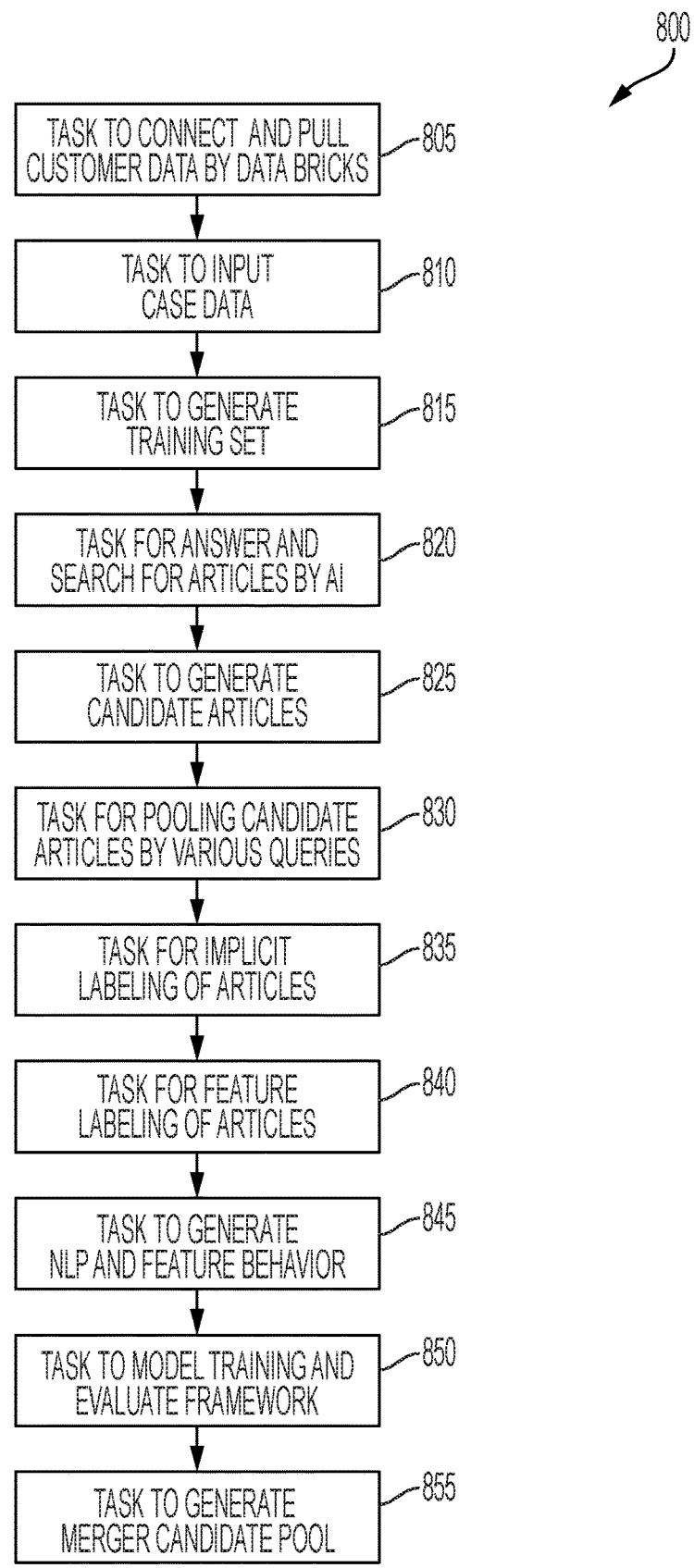
FIG. 8 is an exemplary flowchart of Tasks of the article recommender system in accordance with an embodiment.

FIG. 8 is a flowchart of Tasks of the article recommender system in accordance with an embodiment. With reference to FIG. 8, FIG. 8 is a flow chart of an exemplary method 800 for recommending articles in a session by service agents to customers in accordance with an embodiment. More particularly, the exemplary method 800 includes a process of Tasks which are presented in an order that is re-configurable and further each of the Tasks may be further divided or aggregated as well as reordered as desired for an enterprise customer. Initially, the customer is connected in a session on the enterprise network platform and (Task 805) case data is pulled by data bricks to a server. Next, the data block is configured (Task 810) at input to the article recommender app into case data into subject, description and customer specified fields to execute an article recommender app on a server. As the process continues, (Task 815) a training set with input features to configure a set of articles. The (Task 820) AI app generates a set of responses to questions and answers by customers.

In various exemplary embodiments, solutions of the SALESFORCE® EINSTEIN™ app may be in embedded in the process that for example can classify sentiment into positive, negative and neutral pools, provide proactive recommendation services of objects such as articles to customers, and can categorize unstructured text data of content related to customers into defined labels to understand what customers are trying to accomplish. Further, applying log based validations to the implicit labeling of the positive, negative and neutral labeling can be used to confirm the assigned positive, negative and neutral labels according to each pool of articles.

In various exemplary embodiments, in a dataset from a .csv file, the dataset name is inherited from the file name and the .csv file contains sentiment or intent data in this format: "sentiment or intent string", label-name followed by a CRLF. Once this Task is accomplished, then (at Task 825) a set of candidate articles is identified. From this pool of articles, (Task 830) using a set of queries a further subset of pools of articles are created. These pools include: attached articles, recently attached articles, random sampled articles, top viewed articles, and atop number of attached articles. Next, (Task 835) implicit labeling is assigned to the articles in the various pools. In addition, (Task 840) feature labeling may also be assigned to the articles. Using NLP and feature behavior by the AI app (Task 845) content and behavior can be analyzed in conjunction with customer requests to more accurately identify suitable articles by the article recommender system. A model for training and evaluating articles for the customer request or a set of customer requests can be generated (Task 850) using in this instance, a relatively sparse data set that has been augments with features, behavior and indirect content to prevent mismatched responses. That is, in an enterprise platform, the customer base may be limited to only customers with subscriber rights to the enterprise network cloud. In order to ensure accurate results, further analysis, augmenting of the data set as well historical knowledge to responses provided must be all assessed prior to validating a given article pool or proposition to the customer. Also, by other articles can be identified by communicating with the multi-tenant database about the customer request.

Further, the training and evaluating framework must be able to correct results even which may not be sufficient for the data set and further validation by log data, or other meta-data may be used to overcome to meet the accuracy requirement (i.e. in-depth analysis required for accuracy to accomplish the goal). Finally, (Task 850) the candidate pool of articles are merged along with the search logs and service agent feedback.

Figure 9:
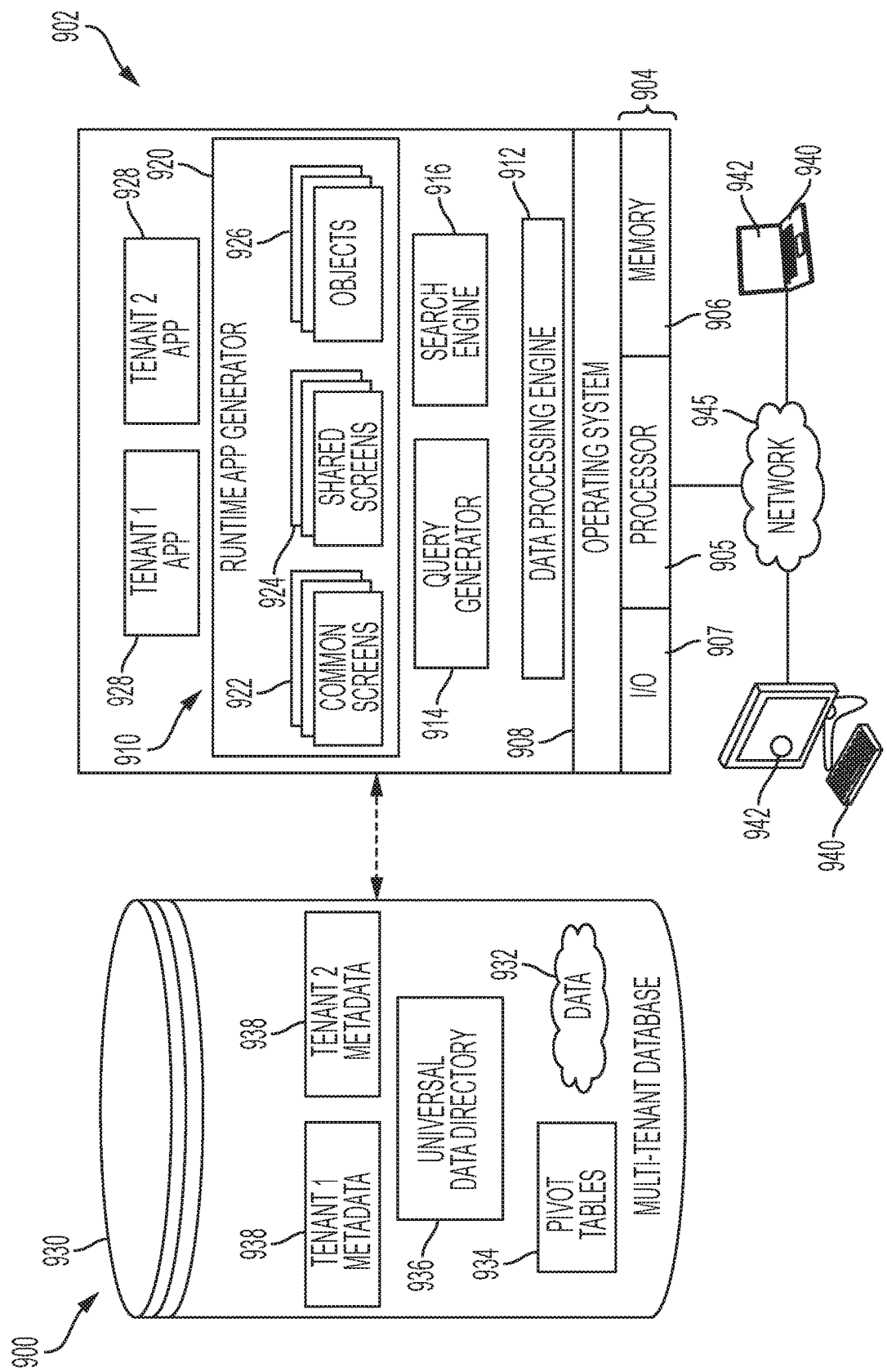
FIG. 9 is a schematic block diagram of a multi-tenant computing environment for use in conjunction with the communication process of the object sharing of the mobile client and agent in accordance with an embodiment.

With reference to FIG. 9, FIG. 9 is a schematic block diagram of a multi-tenant computing environment for use in conjunction with the communication process of the object sharing of the mobile client and agent in accordance with an embodiment. A server may be shared between multiple tenants, organizations, or enterprises, referred to herein as a multi-tenant database. In the exemplary disclosure, article recommendation data and services are provided via a network 945 to any number of tenant devices 940, such as desk tops, laptops, tablets, smartphones, GOOGLE® GLASS™, and any other computing device implemented in an automobile, aircraft, television, or other business or consumer electronic device or system, including web tenants.

Each application 928 is suitably generated at run-time (or on-demand) using a common type of application platform 910 that securely provides access to the data 932 in the multi-tenant database 930 for each of the various tenant organizations subscribing to the service cloud 900. In accordance with one non-limiting example, the service cloud 900 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that shares access to common subset of the data within the multi-tenant database 930. In this regard, each tenant includes one or more users and/or groups associated with, authorized by, or otherwise belonging to that respective tenant. Stated another way, each respective user within the multi-tenant system of the service cloud 900 is associated with, assigned to, or otherwise belongs to a particular one of the plurality of enterprises supported by the system of the service cloud 900.

Each enterprise tenant may represent a company, corporate department, business or legal organization, and/or any other entities that maintain data for particular sets of users (such as their respective employees or customers) within the multi-tenant system of the service cloud 900. Although multiple tenants may share access to the server 902 and the multi-tenant database 930, the particular data and services provided from the server 902 to each tenant can be securely isolated from those provided to other tenants. The multi-tenant architecture therefore allows different sets of users to share functionality and hardware resources without necessarily sharing any of the data 932 belonging to or otherwise associated with other organizations.

The multi-tenant database 930 may be a repository or other data storage system capable of storing and managing the data 932 associated with any number of tenant organizations. The multi-tenant database 930 may be implemented using conventional database server hardware. In various embodiments, the multi-tenant database 930 shares the processing hardware 904 with the server 902. In other embodiments, the multi-tenant database 930 is implemented using separate physical and/or virtual database server hardware that communicates with the server 902 to perform the various functions described herein.

In an exemplary embodiment, the multi-tenant database 930 includes a database management system or other equivalent software capable of determining an optimal query plan for retrieving and providing a particular subset of the data 932 to an instance of application (or virtual application) 928 in response to a query initiated or otherwise provided by an application 928, as described in greater detail below. The multi-tenant database 930 may alternatively be referred to herein as an on-demand database, in that the multi-tenant database 930 provides (or is available to provide) data at run-time to on-demand virtual applications 928 generated by the application platform 910, as described in greater detail below.

In practice, the data 932 may be organized and formatted in any manner to support the application platform 910. In various embodiments, the data 932 is suitably organized into a relatively small number of large data tables to maintain a semi-amorphous "heap"-type format. The data 932 can then be organized as needed for a particular virtual application 928. In various embodiments, conventional data relationships are established using any number of pivot tables 934 that establish indexing, uniqueness, relationships between entities, and/or other aspects of conventional database organization as desired. Further data manipulation and report formatting is generally performed at run-time using a variety of metadata constructs. Metadata within a universal data directory (UDD) 936, for example, can be used to describe any number of forms, reports, workflows, user access privileges, business logic and other constructs that are common to multiple tenants.

Tenant-specific formatting, functions and other constructs may be maintained as tenant-specific metadata 938 for each tenant, as desired. Rather than forcing the data 932 into an inflexible global structure that is common to all tenants and applications, the multi-tenant database 930 is organized to be relatively amorphous, with the pivot tables 934 and the metadata 938 providing additional structure on an as-needed basis. To that end, the application platform 910 suitably uses the pivot tables 934 and/or the metadata 938 to generate "virtual" components of the virtual applications 928 to logically obtain, process, and present the relatively amorphous data from the multi-tenant database 930.

The server 902 may be implemented using one or more actual and/or virtual computing systems that collectively provide the dynamic type of application platform 910 for generating the virtual applications 928. For example, the server 902 may be implemented using a cluster of actual and/or virtual servers operating in conjunction with each other, typically in association with conventional network communications, cluster management, load balancing and other features as appropriate. The server 902 operates with any sort of processing hardware 904 which is conventional, such as a processor 905, memory 906, input/output features 907 and the like. The input/output features 907 generally represent the interface(s) to networks (e.g., to the network 945, or any other local area, wide area or other network), mass storage, display devices, data entry devices and/or the like.

The processor 905 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 906 represents any non-transitory short or long term storage or other computer-readable media capable of storing programming instructions for execution on the processor 905, including any sort of random access memory (RAM), read only memory (ROM), flash memory, magnetic or optical mass storage, and/or the like. The computer-executable programming instructions, when read and executed by the server 902 and/or processor 905, cause the server 902 and/or processor 905 to create, generate, or otherwise facilitate the application platform 910 and/or virtual applications 928 and perform one or more additional Tasks, operations, functions, and/or processes described herein. It should be noted that the memory 906 represents one suitable implementation of such computer-readable media, and alternatively or additionally, the server 902 could receive and cooperate with external computer-readable media that is realized as a portable or mobile component or platform, e.g., a portable hard drive, a USB flash drive, an optical disc, or the like.

The application platform 910 is any sort of software application or other data processing engine that generates the virtual applications 928 that provide data and/or services to the tenant devices 940. In a typical embodiment, the application platform 910 gains access to processing resources, communications interface and other features of the processing hardware 904 using any sort of conventional or proprietary operating system 908. The virtual applications 928 are typically generated at run-time in response to input received from the tenant devices 940. For the illustrated embodiment, the application platform 910 includes a bulk data processing engine 912, a query generator 914, a search engine 916 that provides text indexing and other search functionality, and a runtime application generator 920. Each of these features may be implemented as a separate process or other module, and many equivalent embodiments could include different and/or additional features, components or other modules as desired.

The runtime application generator 920 dynamically builds and executes the virtual applications 928 in response to specific requests received from the tenant devices 940. The virtual applications 928 are typically constructed in accordance with the tenant-specific metadata 938, which describes the particular tables, reports, interfaces and/or other features of the particular application 928. In various embodiments, each virtual application 928 generates dynamic web content that can be served to a browser or other tenant program 942 associated with its tenant device 940, as appropriate.

The runtime application generator 920 suitably interacts with the query generator 914 to efficiently obtain data 932 from the multi-tenant database 930 as needed in response to input queries initiated or otherwise provided by users of the tenant devices 140. In a typical embodiment, the query generator 914 considers the identity of the user requesting a particular function (along with the user's associated tenant), and then builds and executes queries to the multi-tenant database 930 using system-wide metadata 936, tenant specific metadata, pivot tables 934, and/or any other available resources. The query generator 914 in this example therefore maintains security of the common database by ensuring that queries are consistent with access privileges granted to the user and/or tenant that initiated the request.

With continued reference to FIG. 9, the bulk data processing engine 912 performs bulk processing operations on the data 932 such as uploads or downloads, updates, online transaction processing, and/or the like. In many embodiments, less urgent bulk processing of the data 932 can be scheduled to occur as processing resources become available, thereby giving priority to more urgent data processing by the query generator 914, the search engine 916, the virtual applications 928, etc.

In exemplary embodiments, the application platform 910 is utilized to create and/or generate data-driven virtual applications 928 for the tenants that they support. Such virtual applications 928 may make use of interface features such as custom (or tenant-specific) screens 924, standard (or universal) screens 922 or the like. Any number of custom and/or standard objects 926 may also be available for integration into tenant-developed virtual applications 928. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system.

The data 932 associated with each virtual application 928 is provided to the multi-tenant database 930, as appropriate, and stored until it is requested or is otherwise needed, along with the metadata 938 that describes the particular features (e.g., reports, tables, functions, objects, fields, formulas, code, etc.) of that particular virtual application 928. For example, a virtual application 928 may include a number of objects 926 accessible to a tenant, wherein for each object 926 accessible to the tenant, information pertaining to its object type along with values for various fields associated with that respective object type are maintained as metadata 938 in the multi-tenant database 930. In this regard, the object type defines the structure (e.g., the formatting, functions and other constructs) of each respective object 926 and the various fields associated therewith.

Still referring to FIG. 9, the data and services provided by the server 902 can be retrieved using any sort of personal computer, mobile telephone, tablet or other network-enabled tenant device 940 on the network 945. In an exemplary embodiment, the tenant device 940 includes a display device, such as a monitor, screen, or another conventional electronic display capable of graphically presenting data and/or information retrieved from the multi-tenant database 930, as described in greater detail below.

Typically, the user operates a conventional browser application or other tenant program 942 executed by the tenant device 940 to contact the server 902 via the network 945 using a networking protocol, such as the hypertext transport protocol (HTTP) or the like. The user typically authenticates his or her identity to the server 902 to obtain a session identifier ("Session ID") that identifies the user in subsequent communications with the server 902. When the identified user requests access to a virtual application 928, the runtime application generator 920 suitably creates the application at run time based upon the metadata 938, as appropriate. However, if a user chooses to manually upload an updated file (through either the web based user interface or through an API), it will also be shared automatically with all of the users/devices that are designated for sharing.

As noted above, the virtual application 928 may contain Java, ActiveX, or other content that can be presented using conventional tenant software running on the tenant device 940; other embodiments may simply provide dynamic web or other content that can be presented and viewed by the user, as desired. As described in greater detail below, the query generator 914 suitably obtains the requested subsets of data 932 from the multi-tenant database 930 as needed to populate the tables, reports or other features of the particular virtual application 928. In various embodiments, application 928 embodies the functionality of article recommender app system, as described in connection with FIGS. 1-8.

In various embodiments in conjunction with the disclosure herein and with the FIGS. 1-9, there is described a method and system for recommending articles, including: executing a session between a service agent and a customer using a service agent app of an enterprise network hosted by a server to connect to the customer; receiving a customer request from the customer to the service agent in the session; generating case data, by an article recommender app configured with the service agent app at the server, from the customer request wherein the case data at least comprises: subject and description data of the customer request; configured a training set by the article recommender app based at least on the subject and description data; identifying, by an artificial intelligence (AI) app hosted by the server, a first pool of articles from at least a knowledge database wherein the knowledge database comprises articles that are relevant and not relevant to the customer request; identifying, by the article recommender app, by at least one query, a second pool of articles of attached articles to the case from a case article database to merge together with the first pool into a merged pool of articles; assigning, by the AI app, an implicit label to at least the first or second pool of articles wherein the implicit label comprises: a positive label or a negative label; applying a model derived by the AI app based on customer behavior and a set of features related to the case to classify each article of the merged pool of articles on comparisons of quality and relevancy to the customer request; identifying, by the AI app, a final set of articles from the merged pool of articles based on the model and the implicit label to send to the service agent during the session; and retrieving, by the service agent, at least an article of the final set of articles to view during the session.

Further, in various embodiments described herein there are features described with the FIGS. 1-9 of applying log based validations to the implicit labeling to confirm the positive and negative labels according to the first or second pool of articles; retrieving, by the service agent, an article of the final pool of articles to send to the customer during the session; ranking, by the AI app, the articles of at least the final pool of articles prior to retrieval by the service agent; applying natural language processing (NLP) techniques in the classifying by the model of the AI app to analyze the content of each article for the comparisons of quality and relevancy to the customer request; identifying, by the article recommender app, by further queries in the set of queries the subset pool of articles comprising: a third pool of recently attached articles from the case article attachment database; identifying, by the article recommender app, by further queries in the set of queries, the subset pool of articles comprising: a fourth pool of top viewed articles from the knowledge article database; identifying, by the article recommender app, by further queries in the set of queries, the subset pool of articles comprising: a fifth pool of random sampled articles from the knowledge article database; and identifying, by the article recommender app, other articles by communicating with a multi-tenant database about the customer request.

The techniques and technologies may be described herein in terms of functional and/or logical block components, and with reference to symbolic representations of operations, processing Tasks, and functions that may be performed by various computing components or devices. Such operations, Tasks, and functions are sometimes referred to as being computer-executed, computerized, software-implemented, or computer-implemented. In practice, one or more processor devices can carry out the described operations, Tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various Tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The term "Node/Port"—as used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node). As used herein, a "port" means a node that is externally accessible via, for example, a physical connector, an input or output pin, a test probe, a bonding pad, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIG. 9 depicts one exemplary arrangement of elements, additional intervening elements, devices, features, or components may be present in an embodiment of the depicted subject matter.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The various Tasks performed in connection with viewing, object identification, sharing and information retrieving processes between the customer and service agent in service agent app may be performed by software, hardware, firmware, or any combination thereof. For illustrative purposes, the following description of article recommender app, article recommendation system, and enterprise network may refer to elements mentioned above in connection with FIGS. 1-9. In practice, portions of process of FIGS. 1-9 may be performed by different elements of the described system, e.g., mobile clients, agents, in-app applications etc. It should be appreciated that process of FIGS. 1-9 may include any number of additional or alternative Tasks, the Tasks shown in FIGS. 1-9 need not be performed in the illustrated order, and process of the FIGS. 1-9 may be incorporated into a more comprehensive procedure or process having additional functionality not described in detail herein. Moreover, one or more of the Tasks shown in FIG. 1-9 could be omitted from an embodiment of the process shown in FIGS. 1-9 as long as the intended overall functionality remains intact.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for recommending articles during a session between a client and an agent, the method comprising:
receiving, at a server of an enterprise network cloud, a request related to a case from the client during the session over a network;
obtaining case data for the case related to the request, wherein the case data comprises at least one of a subject and a description of the request;
identifying, based on the case data, a first pool of articles that are relevant to the request from a knowledge database of the enterprise network cloud;
identifying a second pool of articles previously used in other cases at the enterprise network cloud to merge together with the first pool of articles into a merged pool of articles, wherein the second pool of articles comprise articles attached to at least one of the other cases in a database table at the enterprise network cloud;
determining a set of feature vectors derived from case and article vector associations using natural language processing (NLP) to construct a feature space for the merged pool of articles from structured case data for the other cases;
associating positive and negative labels for the set of feature vectors, wherein associating the positive and negative labels comprises classifying articles in the merged pool of articles to assign a respective one of the positive and negative labels to a respective article in the merged pool of articles based at least in part on whether the respective article is attached to one of the other cases at the enterprise network cloud, wherein for a respective pair of the respective article in the merged pool of articles and a respective one of the other cases, the positive label is assigned to the respective article when the respective article is attached to the respective one of the other cases and the negative label is assigned when the respective article is not attached to the respective one of the other cases;
using artificial intelligence to generate a ranking model based at least in part on the set of feature vectors and the positive and negative labels associated with the respective articles in the merged pool of articles;
ranking the articles in the merged pool of articles based at least in part on a respective positive or negative label assigned to the respective article and at least one of usage and content of the respective article using the ranking model;
identifying a recommended article responsive to the request based on the ranking of the articles in the merged pool; and
providing the recommended article to at least one of a user interface associated with the agent and a display associated with an application at a device associated with the client.

2. The method of claim 1, further comprising:
retrieving, by the agent, the recommended article responsive to the request to send to the client during the session.

3. The method of claim 1, further comprising:
applying natural language processing (NLP) techniques to classify the articles in the merged pool of articles by analyzing the content of each of the respective articles in the merged pool of articles for comparisons of quality and relevance to the request.

4. The method of claim 1, further comprising:
applying log based validations to an implicit labeling to confirm the respective positive or negative label assigned to a respective article of the merged pool of articles.

5. The method of claim 1, further comprising identifying a third pool of top viewed articles from the knowledge database, wherein the merged pool of articles includes the third pool of top viewed articles.

6. The method of claim 5, further comprising identifying a fourth pool of random sampled articles from the knowledge database, wherein the merged pool of articles includes the fourth pool of random sampled articles.

7. The method of claim 1, wherein identifying the second pool of articles comprises communicating with a multi-tenant database about the request, wherein the multi-tenant database comprises the knowledge database.

8. The method of claim 1, wherein:
the application comprises an enterprise application; and
the request comprises a service request for support of the enterprise application.

9. The method of claim 1, wherein the recommended article comprises an attached article used by another agent to resolve another case.

10. A computer program product tangibly embodied in a non-transitory computer-readable storage device and comprising instructions that when executed by a processor perform a method comprising:
receiving, at a server of an enterprise network cloud, a request related to a case from a client during a session over a network between the client and an agent;
obtaining case data for the case related to the request, wherein case data comprises at least one of a subject and a description of the request;
identifying, based on the case data, a first pool of articles that are relevant to the request from a knowledge database of the enterprise network cloud;
identifying a second pool of articles previously used in other cases at the enterprise network cloud to merge together with the first pool of articles into a merged pool of articles, wherein the second pool of articles comprise articles attached to at least one of the other cases in a database table at the enterprise network cloud;
determining a set of feature vectors derived from case and article vector associations using natural language processing (NLP) to construct a feature space for the merged pool of articles from structured case data for the other cases;
associating positive and negative labels for the set of feature vectors, wherein associating the positive and negative labels comprises classifying articles in the merged pool of articles to assign a respective one of the positive and negative labels to a respective article based at least in part on whether the respective article is attached to one of the other cases at the enterprise network cloud, wherein for a respective pair of the respective article in the merged pool of articles and a respective one of the other cases, the positive label is assigned to the respective article when the respective article is attached to the respective one of the other cases and the negative label is assigned when the respective article is not attached to the respective one of the other cases;

using artificial intelligence to generate a ranking model based at least in part on the set of feature vectors and the positive and negative labels associated with the respective articles in the merged pool of articles;

ranking the articles in the merged pool of articles based at least in part on a respective positive or negative label assigned to the respective article and at least one of usage and content of the respective article using the ranking model;

identifying a recommended article responsive to the request based on the ranking of the articles in the merged pool; and providing the recommended article to at least one of a user interface associated with the agent and a display associated with an application at a device associated with the client.

11. The computer program product of claim 10, comprising instructions for the processor to perform the method further comprising applying log based validations to an implicit labeling to confirm positive and negative labels assigned to the respective articles of the merged pool of articles.

12. The computer program product of claim 10, comprising instructions for the processor to perform the method further comprising retrieving, by the agent, the recommended article responsive to the request to send to the client during the session.

13. The computer program product of claim 10, comprising instructions for the processor to perform the method further comprising applying natural language processing (NLP) techniques to classify the articles in the merged pool of articles by analyzing the content of each of the respective articles in the merged pool of articles for comparisons of quality and relevance to the request.

14. A system comprising:
at least one processor; and
at least one computer-readable storage device comprising instructions that when executed by the at least one processor causes performance of a method comprising:
receiving, at a server of an enterprise network cloud, a request related to a case from a client during a session over a network between the client and an agent;

obtaining case data for the case related to the request, wherein case data comprises at least one of a subject and a description of the request;

identifying, based on the case data, a first pool of articles that are relevant to the request from a knowledge database of the enterprise network cloud;

identifying a second pool of articles previously used in other cases at the enterprise network cloud to merge together with the first pool of articles into a merged pool of articles, wherein the second pool of articles comprise articles attached to at least one of the other cases in a database table at the enterprise network cloud;

determining a set of feature vectors derived from case and article vector associations using natural language processing (NLP) to construct a feature space for the merged pool of articles from structured case data for the other cases;

associating positive and negative labels for the set of feature vectors, wherein associating the positive and negative labels comprises classifying articles in the merged pool of articles to assign a respective one of the positive and negative labels to a respective article in the merged pool of articles based at least in part on whether the respective article is attached to one of the other cases at the enterprise network cloud, wherein for a respective pair of the respective article in the merged pool of articles and a respective one of the other cases, the positive label is assigned to the respective article when the respective article is attached to the respective one of the other cases and the negative label is assigned when the respective article is not attached to the respective one of the other cases;

using artificial intelligence to generate a ranking model based at least in part on the set of feature vectors and the positive and negative labels associated with the respective articles in the merged pool of articles;

ranking the articles in the merged pool of articles based at least in part on a respective positive or negative label assigned to the respective article and at least one of usage and content of the respective article using the ranking model;

identifying a recommended article responsive to the request based on the ranking of the articles in the merged pool; and providing the recommended article to at least one of a user interface associated with the agent and a display associated with an application at a device associated with the client.

* * * * *